(12) United States Patent
Ranalli (10) Patent No.: US 6,362,879 B1
(45) Date of Patent: Mar. 26, 2002

(54) HIGH RESOLUTION NON-SCANNING SPECTROMETER

(75) Inventor: Eliseo R. Ranalli, Irvin, CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/512,939

(22) Filed: Feb. 25, 2000

(51) Int. Cl.$^7$ .................................................. G01J 3/18
(52) U.S. Cl. ...................................................... 356/328
(58) Field of Search ................................ 356/305, 326, 356/328

(56) References Cited

U.S. PATENT DOCUMENTS 6,078,048 A * 6/2000 Stevens et al. ............. 356/328

* cited by examiner

Primary Examiner—F. L. Evans (74) Attorney, Agent, or Firm—Terry S. Callaghan; Juliana Agon

(57) ABSTRACT

An optical spectrometer includes an echelle array disposed in the path of a light signal so as to diffract the incident light signal. The light signal falls within a predetermined wavelength band centered about a central wavelength. The echelle array has a plurality of diffraction scattering sites periodically spaced apart by a distance of at least about five times the central wavelength. The spectrometer further includes a photodetector array positioned to receive a far-field diffraction pattern produced by the diffracted light from the echelle array and to output electrical signals representing the spatial pattern and relative intensity of the far-field diffraction pattern. Additionally, the spectrometer includes a processing circuit coupled to the photodetector array for processing the electrical signals to determine the power spectrum of the light signal. The processor circuit calibrates by measuring far-field diffraction patterns and determining SIRs for light at a plurality of different known wavelengths. When the light signal is projected onto the echelle array, the processing circuit determines the power spectrum by deconvolving the SIRs obtained during calibration from the far-field diffraction pattern measured for the light signal.

20 Claims, 6 Drawing Sheets

10 GHz away (1545.08 nm):

FIG. 5E

20 GHz away (1545.16 nm):

HIGH RESOLUTION NON-SCANNING SPECTROMETER

BACKGROUND OF THE INVENTION

1. Field of the Invention

The present invention generally relates to an optical spectrometer. More specifically, the present invention relates to a polarization-independent, high resolution, non-scanning optical spectrometer.

2. Technical Background

High resolution spectrometers are used in a wide variety of optical applications particularly in optical communication networks. As just a few examples, spectrometers may be used as a channel monitor in a wavelength division multiplexed (WDM) optical communication network, as a polarization mode dispersion (PMD) sensor, or to measure the optical power spectrum of any optical field propagating through an optical network.

In general, spectrometers are classified as either scanning or non-scanning spectrometers. While scanning spectrometers can exhibit very high spectral resolutions, the fact that they must be scanned limits their usefulness to the domain of optical signals whose spectrum does not change appreciably over the required scan time. Non-scanning spectrometers provide an attractive method for estimating the power spectral density of an incident optical signal because the far-field pattern, which serves as the spectral estimate, is available more or less instantaneously and therefore can be used to estimate the power spectrum of very short-lived signals.

As described further below, spectrometers often utilize diffraction gratings to diffract incident light and form a far-field optical pattern from which a power spectral estimate may be obtained. Diffraction gratings typically include a plurality of periodically and equally spaced grooves that act as scattering sites to scatter the incident light. The light scattered from each of the grooves creates an interference pattern a distance away from the grating (known as the far-field diffraction or Fraunhofer pattern). The resulting far-field pattern exhibits regions or peaks of high intensity for a given wavelength, which are commonly called diffraction orders. Examples of the far-field patterns for two different wavelengths are shown in FIG. 1.

Figure 1:
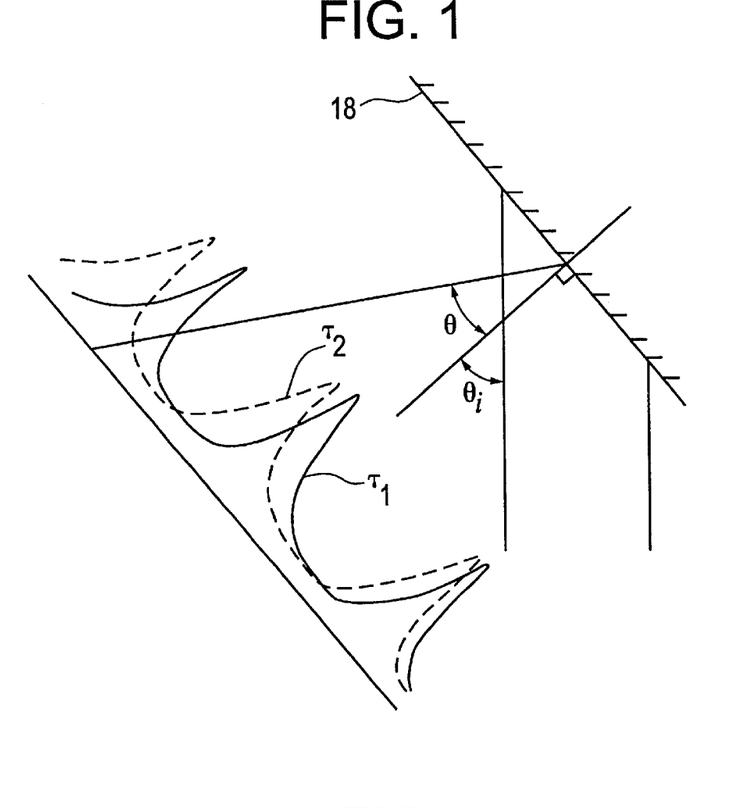
FIG. 1 is a diagram illustrating two far-field patterns for incident light signals at two different wavelengths as produced using the conventional spectrometer shown in FIG. 2.

As apparent from FIG. 1, the variation in wavelengths of the incident light signal produces a corresponding shift and stretching out of the diffraction order peaks in the far-field pattern. It is this shifting of the diffraction order peaks that enables the power spectrum to be determined. When a diffraction grating has grooves that are inconsistent in size or not perfectly spaced apart, the far-field pattern changes so that the diffraction order peaks are not well defined. Consequently, such imprecision of the grating makes it more difficult to spatially resolve the far-field pattern and hence makes it more difficult to determine the power spectral density of the incident signal. Accordingly, the resolving power of a spectrometer incorporating a diffraction grating is normally considered to be the degree to which the resonant diffraction order peaks in the far-field can be spatially resolved.

In order to increase the ability to resolve the far-field pattern, the number of grooves in the grating that are illuminated by the incident beam must be significantly increased as must the cross-sectional area of the beam that impinges upon the diffraction grating. This technique is effective until such point that aberrations in the optical system limit the separability of the wavelengths. Such aberrations begin to appear as the spacing between the grooves of the diffraction grating decreases.

To obtain sufficient resolution, the spacing between the grooves of the diffraction grating must be small relative to the wavelength of the incident light signal. In a WDM system, the wavelengths of such light signals are on the order of 1.5 microns. Thus, to obtain sufficient resolution, the spacing between the grooves of the diffraction grating must be extremely small and precise. If the spacing between each of the grooves in the diffraction grating is not consistent, aberrations appear thereby reducing the resolution of the spectrometer. When the groove spacings are less than the 1.5 nm wavelengths employed in WDM systems, it is nearly impossible to precisely equally space the diffraction grooves without introducing some error.

Figure 2:
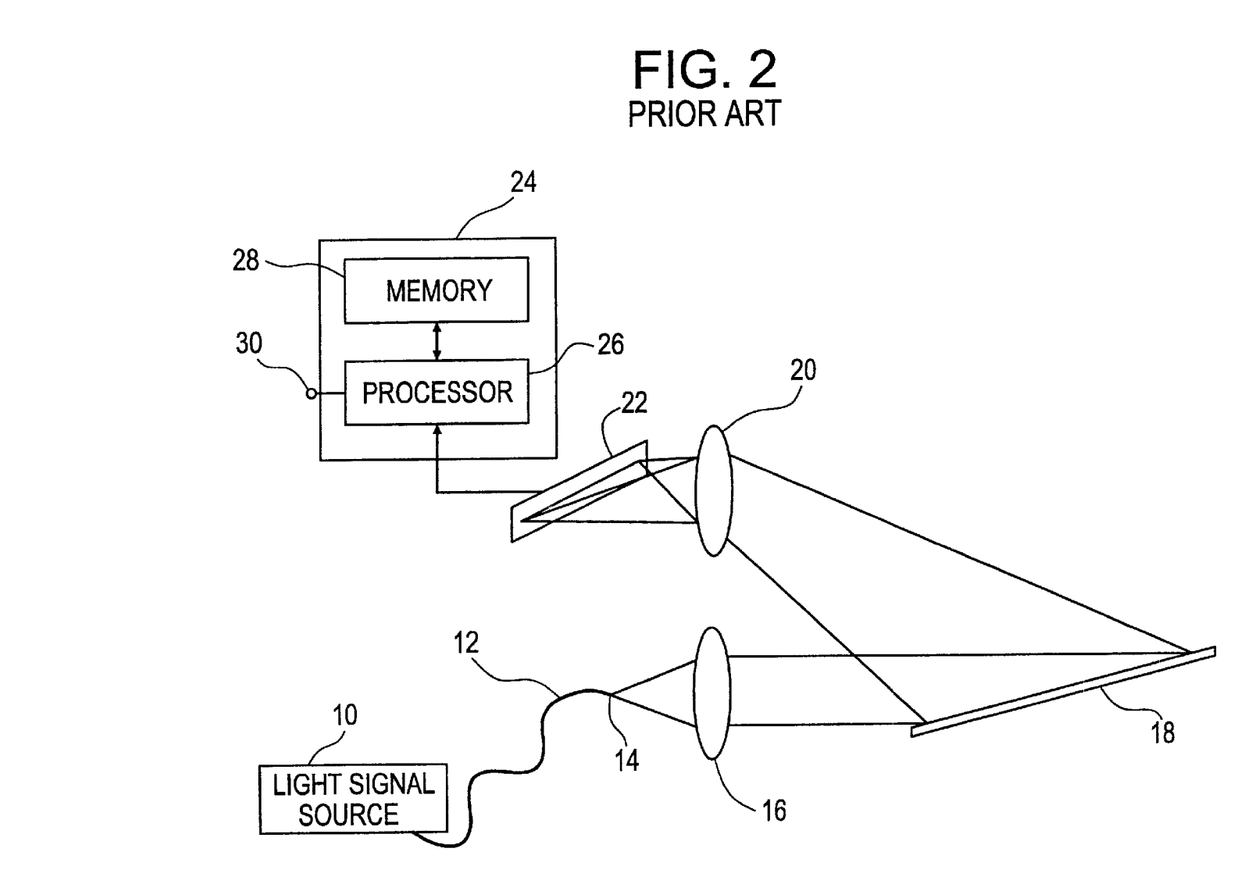
FIG. 2 is a system diagram of a conventional non-scanning spectrometer in block and schematic form.

FIG. 2 shows an example of a non-scanning spectrometer. As illustrated, the spectrometer includes a light signal source 10 coupled to a fiber 12 from which a light signal from light source 10 is projected. The spectrometer further includes a first lens 16 for collimating the light signal projected from an end 14 of fiber 12. The collimated light is projected onto a diffraction grating 18, which includes a large number of grooves. The grooves of diffraction grating 18 sample and reradiate the incident light signals. These temporal samples are separated by a fixed sampling interval. The spectrometer further includes a second lens 20 serving as a Fourier Transform lens that collects a portion of the scattered beam from diffraction grating 18 and relays the diffracted far-field pattern to a linear photodetector array 22. Linear photodetector array 22 supplies electrical signals representing the spatial relation and relative intensity levels of the resulting far-field diffraction pattern to a processing circuit 24. Processing circuit 24 includes a microprocessor 26 and a memory device 28, which may be a separate component of processing circuit 24 or may be integral with microprocessor 26. A display or printer may be connected to an output port 30 of processing circuit 24 to obtain a radiant of an estimate of the power spectrum of the light signal emitted from end 14 of fiber 12. Processing circuit 24 estimates the power spectrum of the incident light signals by analyzing the resulting far-field pattern that results from the diffraction of the incident light by diffraction grating 18 and which is sensed by linear photodetector array 22.

Depending upon the particular application of the spectrometer, conventional non-scanning spectrometers suffer from different deficiencies. When used as a PMD sensor, the resolution required is considerably smaller than the bandwidth of a modulated laser, which is typically about 20 GHz. Thus, an effective PMD sensor may require a resolution of 4 GHz. One would not expect to obtain the required spectral features of a PMD sensor using a non-scanning spectrometer since that would require using an echelle grating in a diffraction order in the hundred's—a practical impossibility using currently available gratings.

When a non-scanning spectrometer is used as a WDM channel monitor, resolution is less of a problem since channel spacings are on the order of 50 GHz. However, when used as a channel monitor, non-scanning spectrometers require a high signal-to-noise ratio (SNR), which, in turn, has required a high precision grating. More specifically, any non-uniformity in the grooves in the grating raises the noise floor for the spectral estimate from the "Airy" floor, thereby resulting in deviations from what would otherwise be a perfect Airy function (also known as "ghosting"). For a WDM channel monitor, a typical resolution of 40 or 60 dB may be required to properly identify the ASE noise floor, which otherwise would not be visible if the SNR of the spectrometer where smaller than that. Thus, it has generally been accepted that to improve the SNR, more precise, and hence much more expensive, gratings must be used.

SUMMARY OF THE INVENTION

Accordingly, it is an aspect of the present invention to provide a relatively inexpensive spectrometer having sufficiently high resolution for use as a PMD sensor or the like, that does not require the high precision diffraction grating of prior non-scanning spectrometers. It is another aspect of the invention to provide a spectrometer having a high resolution that is less susceptible to variation due to imprecise groove spacing of a diffracting member.

To achieve these and other aspects and advantages, a spectrometer of the present invention comprises an echelle array disposed in the path of a light signal so as to diffract the incident light signal. The light signal falls within a predetermined wavelength band that is centered about a central wavelength. The echelle array has a plurality of diffraction scattering sites periodically spaced apart by a distance of at least about five times the central wavelength. The spectrometer further includes a photodetector array positioned to receive a far-field diffraction pattern produced by the diffracted light from the echelle array and to output electrical signals representing the spatial pattern and relative intensity of the far-field diffraction pattern. Additionally, the spectrometer includes a processing circuit coupled to the photodetector array for processing the electrical signals to determine the power spectrum of the light signal.

It is another aspect of the present invention to provide an inexpensive WDM channel modulator having a sufficient SNR. Such a channel modulator may employ a less precise, and hence, inexpensive diffraction grating while increasing the SNR. To achieve this aspect and other advantages, the processor circuit may include a processor and a memory coupled to the processor. The processor calibrates by measuring far-field diffraction patterns and determining spatial impulse responses (SIRs) for light at a plurality of different known wavelengths, and stores the SIRs in a table in the memory. When the light signal is projected onto the echelle array, a far-field diffraction pattern for the light signal is obtained on the photodetector array, and the processor processes the output of the photodetector array to obtain an estimate of the power spectrum for the light signal. The processor provides the estimate of the power spectrum by deconvolving the SIRs obtained during calibration from the far-field diffraction pattern measured for the light signal.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Figure 3:
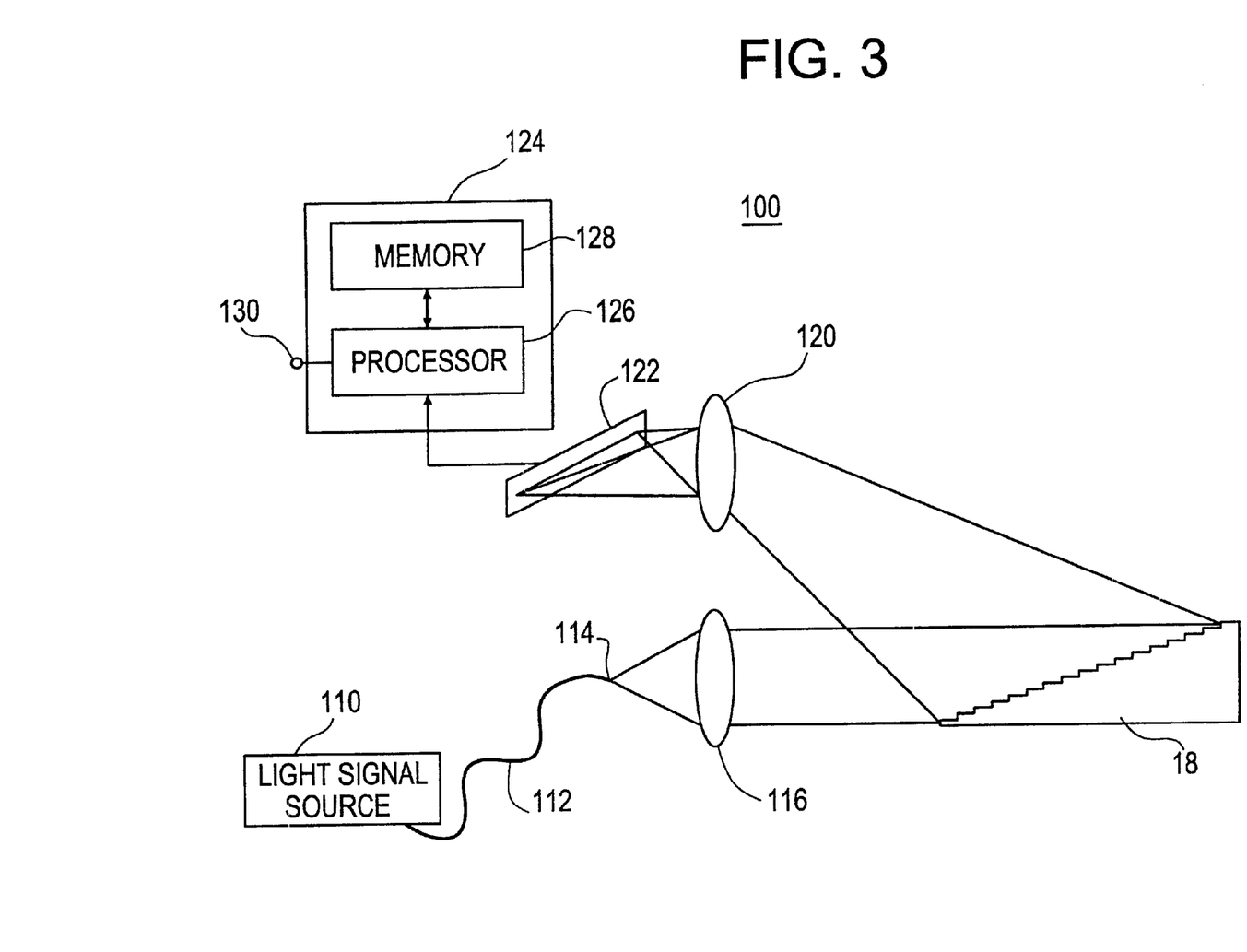
FIG. 3 is a system diagram in block and schematic form of a spectrometer constructed in accordance with the present invention.

FIG. 3 shows a spectrometer 100 constructed in accordance with the present invention. Spectrometer 100 includes a collimating lens 116 that receives divergent light signals from an end 114 of a fiber 112 that is coupled to a source 110 of the light signals. Collimating lens 116 collimates the divergent light emitted from fiber 112 onto an echelle array 118, which diffracts the incident collimated light. Spectrometer 100 further includes a Fourier Transform lens 120, which captures a portion of the diffracted light from echelle array 118 and relays the far-field pattern diffracted by echelle array 118 onto a linear photodetector array 122. Photodetector array 122 supplies electrical signals to a processing circuit 124. These electrical signals represent the relative intensity and spatial relation of the far-field diffraction pattern that is effectively projected onto photodetector array 122. Processing circuit 124 includes a processor 126 and a memory device 128. Processor 126 may be any conventional microprocessor and memory 128 may be a separate component. Alternatively, both processor 126 and 128 may be integrated into a single component such as a conventional microcontroller or microcomputer. Processing circuit 124 further includes an output port 130 coupled to processor 126. Output port 130 provides a means for processor 126 to communicate with either a display or printer or some other external device to enable the reproduction of the power spectrum as estimated by processor 126.

Spectrometer 100 advantageously is constructed to allow the use of a much less expensive echelle array 118 by programming processor 126 to process the received information in a unique manner. When used as a channel monitor, the spectrometer may use a very inexpensive diffraction grating. For example, a diffraction grating made of a stamped plastic may be used. The results obtained from the relaxing of manufacturing tolerances and the resulting lack of precision of the grating is compensated by providing more comprehensive signal processing of the far-field pattern. Using the inventive processing, SNR is reduced and resolution of 50 or 60 dB may be obtained.

Figure 4:
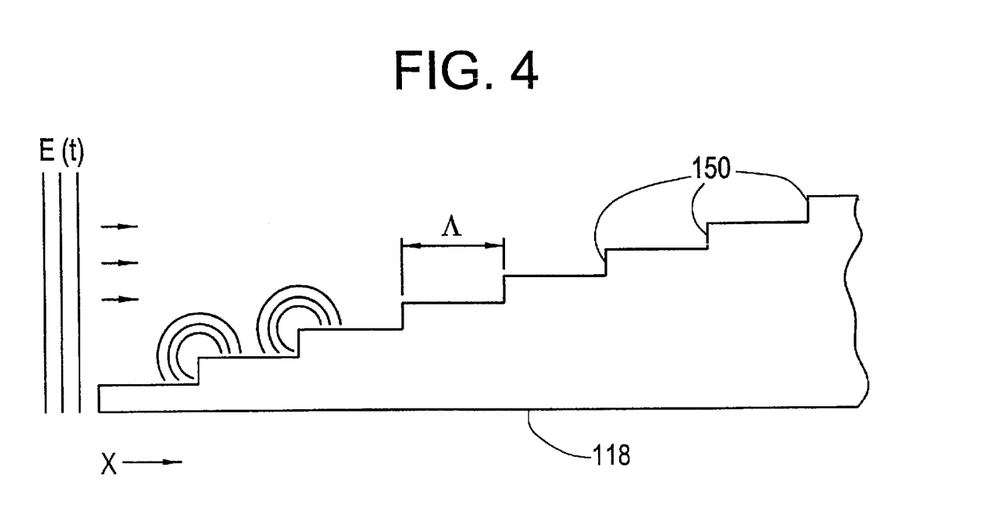
FIG. 4 is an elevational view of an exemplary echelle array that may be employed in the spectrometer shown in FIG. 3.
Figure 5A:
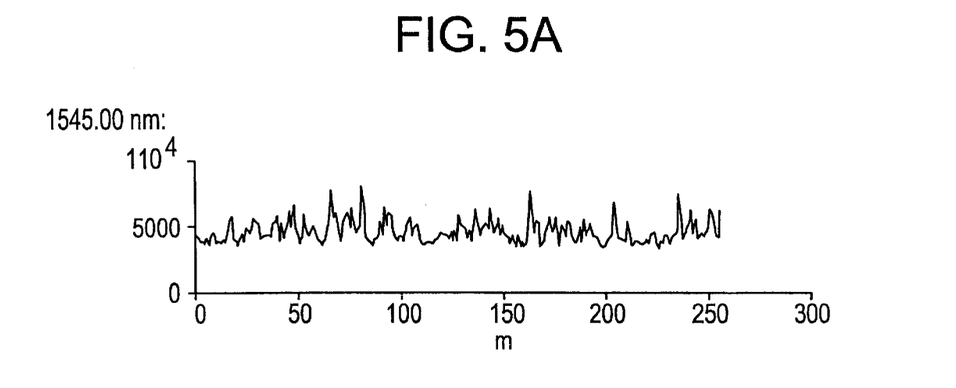
FIGS. 5A–5E are plots of waveforms obtained at various wavelengths using the spectrometer shown in FIG. 3.
Figure 5B:
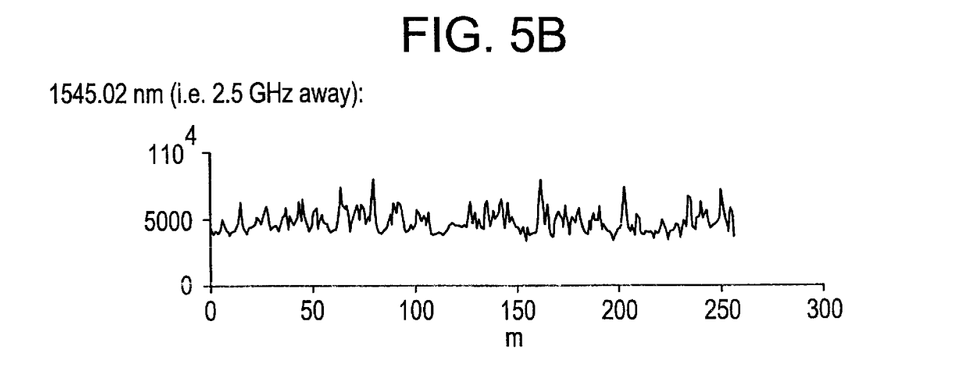
Figure 5C:
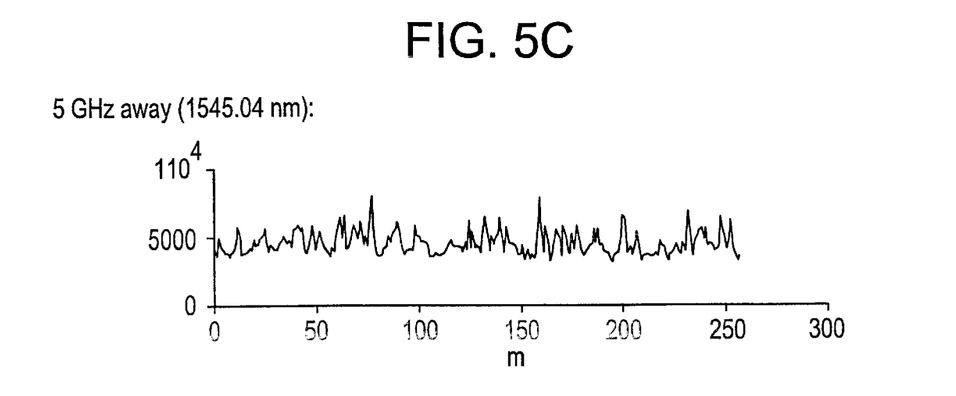
Figure 5D:
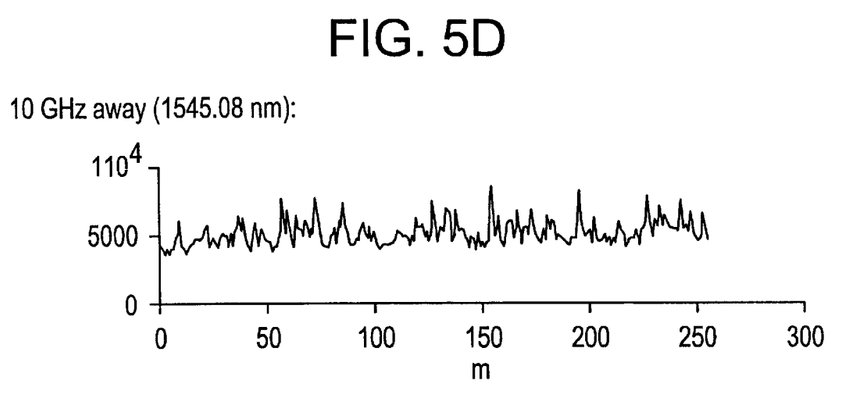
Figure 5E:
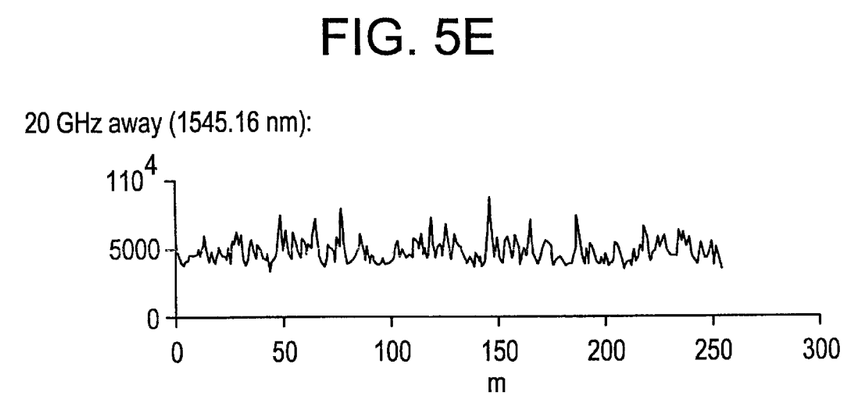
Figure 6A:
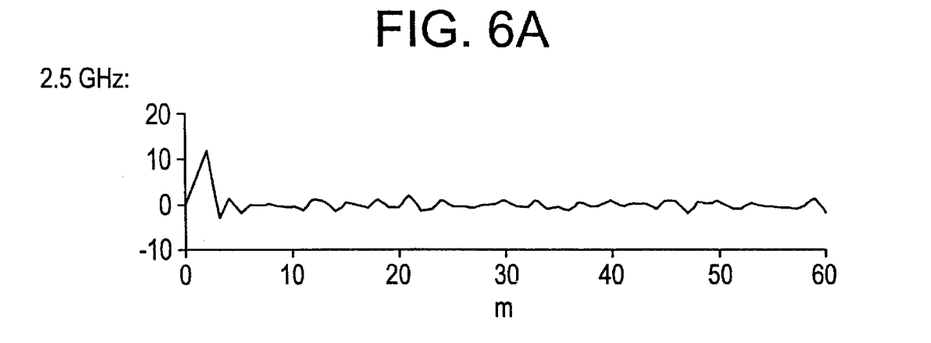
FIGS. 6A–6D are plots of cross-correlation waveforms obtained from the waveforms shown in FIGS. 5A–5F.
Figure 6B:
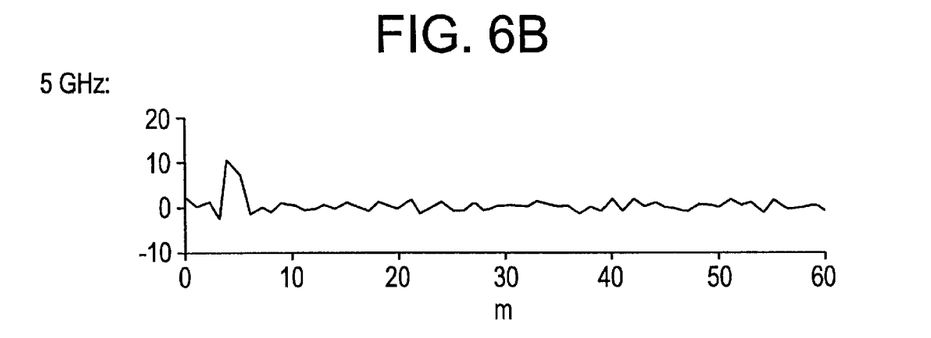
Figure 6C:
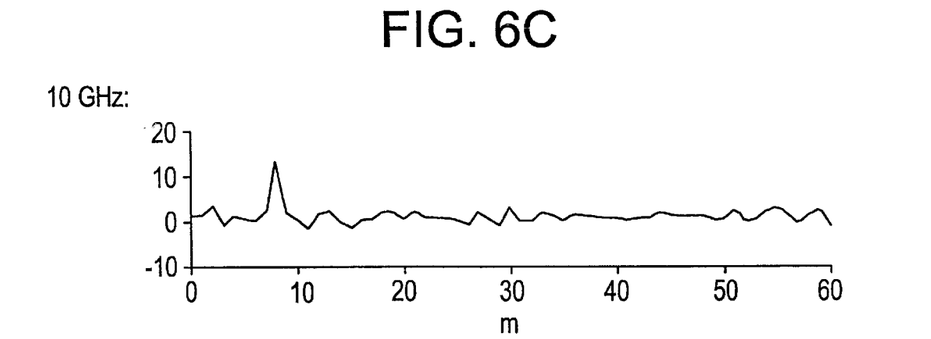
Figure 6D:
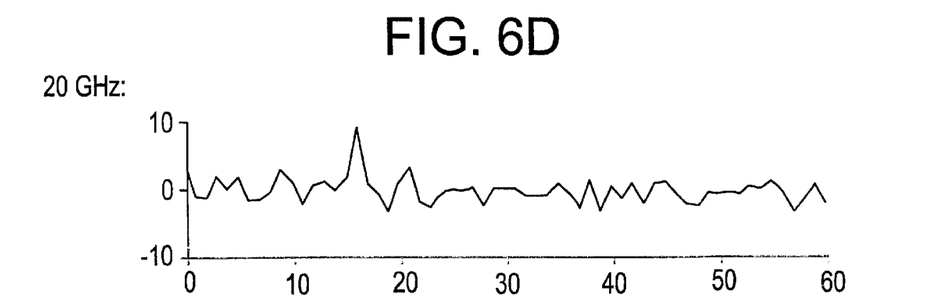

As shown in more detail in FIG. 4, echelle array 118 may have radiators or grooves 150 that are periodically spaced apart by a distance exceeding several wavelengths of the incident light when used in a spectrometer where high resolution over the modulator bandwidth is sought. These radiators/grooves 150 serve as scattering sites that scatter the incident light signal to produce a far-field diffraction pattern. As explained further below, the spacing between scattering sites is preferably at least about 5 times a central wavelength of the waveband to which the spectrometer is responsive, more preferably at least about 50 times the central wavelength, and even more preferably at least about 100 times the central wavelength. In fact, spacings of 750 microns and even 1.5 centimeters have been successfully utilized to resolve light signals at wavelengths of around 1.5 microns. When used as a PMD sensor, the inventive spectrometer has a resolution of at least 4 GHz.

While an echelle array such as that shown in FIG. 4 and described above is much less expensive to produce than the diffraction gratings of the type utilized in the system shown in FIG. 1, such an echelle array with large spacings between radiators 150, produces far-field patterns that are relatively smeared and do not include sharp diffraction order peaks. Accordingly, such patterns are not a good approximation to a Dirac delta function, and hence, the patterns do not allow wavelength shift to be simply equated with a shift in the diffraction angle for a given wavelength at a given order.

To solve this problem, processor 126 is programmed to mathematically process the electrical signals supplied from photodetector array 122 in a manner such that the power spectrum may be accurately estimated despite the smeared far-field pattern that is projected onto photodetector array 122 as a result of the use of the less expensive echelle array 118. Examples of the far-field pattern waveforms from array 118 are shown in FIGS. 5A–5E.

To obtain an accurate estimate of the power spectrum based upon the non-localized far-field patterns, the spectrometer is first calibrated by sequentially projecting light signals having known and different wavelengths from fiber 112. The far-field pattern for each wavelength is then measured using processing circuit 124 and photodetector array 122. Then, for each far-field pattern, the spatial impulse response (SIR) is determined by processor 126 and stored in a table in memory 128. The SIR is the pattern that is measured by photodetector array 122 when an unmodulated laser provides the input signal. Then, when a light signal having an unknown wavelength is subsequently projected from fiber 112, the far-field pattern projected on photodetector array 122 is measured by processor 126. Processor 126 then mathematically deconvolves the Green's functions that were obtained during calibration from the far-field pattern measured for the light emitted from fiber 112 and thereby estimates the power spectrum for that incident light. The detailed manner by which this process occurs is described below.

As shown in FIG. 4, the incident optical field, which is emitted from collimating lens 116 (FIG. 3), is assumed to have a planar phase front (e.g., the incident optical field is collimated from a single-made fiber, near the waist of the Gaussian beam). E(t) represents the time-varying electric field, along any reference polarization, of the incident optical field. As long as the incident and diffracting medium is not birefringent, the technique is polarization independent. In this example, the diffracting radiators (scattering sites) 150 are assumed to be small and hence good approximations to spatial delta functions. Also, errors in periodicity and radiator uniformity are assumed. As with an ordinary grating, each radiator 150 samples and re-radiates the signal E(t) at a delay corresponding to the position along the array. The nominal delay T between samples is $$T = \frac{\sin\theta_i}{c}\Lambda, \quad (1)$$

where $\theta_i$ is the angle which the incident (planar) signal E(t) makes with the echelle grating normal, $\Lambda$ is the grating period, and c the speed of light.

Thus, if x indicates the position along the echelle surface, $\alpha_m$ is the weight (i.e., scattering cross section or relative strength) of the mth radiator, which appears at $x=m\Lambda+\Delta x_m$, where $\Delta x_m$ is the position error (presumably small compared to $\Lambda$), leading to the delay error $\Delta t_m$ (also presumably small compared to T), then the scattered field at the echelle surface is:

$$\xi_{(x,t)} = \sum_m E(t - mT - \Delta tm)\alpha_m \delta(x - m\Lambda - \Delta x_m) \quad (2)$$

To relate this to the Fraunhofer pattern, the following spatial and temporal transforms are utilized:

$$\xi(u, v) = E(v)\sum_m \alpha_m e^{-j2\pi v(mT+\Delta t_m)} e^{-j2\pi u(m\Lambda+\Delta x_m)} \quad (3)$$

$$= E(v)\sum_m \alpha_m e^{-j2\pi(v\Delta t_m + u\Delta x_m)} e^{-j2\pi(vT+u\Lambda)m}, \quad (4)$$

where u is the spatial frequency variable and v is the temporal frequency variable. The first exponential term in Equation (4) is approximately constant for a narrow band signal.

As long as $|\Delta t_m| \ll T$ and $|\Delta x_m| \ll \Lambda$, then the phase variation experienced by the argument of the second exponential is far faster than the first. The following numbers validate the approximation. In this arrangement, $|\Delta x_m| \leq 10$ μm $\Rightarrow |\Delta t_m| \leq 33$ f sec. are realistic errors. Supposing the frequency range of interest is 100 GHz $\Rightarrow$ over the range of frequencies, a phase change by $2\pi(100\times10^9)(33\times10^{-15}) = 20.7$ milliradians is negligible. Thus, the first exponential as a complex constant over the signal bandwidth can be approximated. Obviously, for different WDM channels, that constant would be different, but within a channel it is constant. This complex constant is referred to as $$\beta_m$$

for the mth aperture so, $$\xi(u, v) = E(v)\sum_m \beta_m e^{-j2\pi(vT+u\Lambda)m} \quad (5)$$

As shown below, the main consequence of the $\beta_m$'s not being identical (as in a perfect diffraction grating) is that, what would ordinarily be an Airy pattern, gets smeared into something far more general, but otherwise behaves as a grating, i.e., that pattern maintains its shape, but shifts in center-diffraction angle with increasing wavelength.

By substituting for sampling interval delay T and utilizing diffraction theory, the spatial angular frequency u may be equated with $$u = \frac{\sin\theta_D}{\lambda}$$

(Fraunhofer condition), where θD is the diffraction angle so that the far-field pattern is given by:

$$\xi(\theta_D, v) = E(v) \sum_m \beta_m e^{-j\frac{2\pi}{c}(\sin\theta_i + \sin\theta_D)\Lambda vm}, \text{ where } \lambda = \frac{c}{v} \quad (6)$$

Then, the spatio-temporal power spectral density is given by:

$$|\xi(\theta_D, v)|^2 = S(v) \sum_m \sum_n \beta_m \beta_n^* e^{-j\frac{2\pi}{c}(\sin\theta_i + \sin\theta_D)\Lambda v[m-n]} \quad (7)$$

$$\equiv |E(v)|,$$

which is the temporal power spectral density of the input signal, where $$S(r) = |E(v)|^2.$$

In Equation (6), S(v) is the power spectral density of the input signal. Defining the function:

$$G(\theta_D, v) \equiv \sum_m \sum_n \beta_m \beta_n^* e^{-j\frac{2\pi}{c}(\sin\theta_i + \sin\theta_D)\Lambda v[m-n]}, \quad (8)$$

allows Equation (7) to be rewritten as:

$$|\xi(\theta_D, v)|^2 = S(v)G(\theta_D, v) \quad (9)$$

As a premise, if the frequency is changed by a small amount Δv, the same function results, only shifted in diffraction angle $\theta_D$:

$$G(\theta_D + \Delta\theta, v + \Delta v) = G(\theta_D, v) \quad (10)$$

For this condition to be true, the following equality must hold:

$$v(\sin\theta_i + \sin\theta_D) = [v + \Delta v](\sin\theta_i + \underline{\sin[\theta_D + \Delta\theta]}) \quad (11)$$

$$\sin\theta_D \cos\Delta\theta + \cos\theta_D \sin\Delta\theta$$
$$\approx \sin\theta_D + \cos\theta_D \Delta\theta$$

$$v\sin\theta_i + v\sin\theta_D = v\sin\theta_i + v\sin\theta_D + v\cos\theta_D\Delta\theta + \quad (12)$$
$$\Delta v \sin\theta_i + \Delta v \sin\theta_D + \Delta v \cos\theta_D \Delta\theta$$
$$\Rightarrow \frac{\Delta\theta}{\Delta v} = \frac{d\theta}{dv} = -\frac{(\sin\theta_i + \sin\theta_D)}{v\cos\theta_D}$$

Thus, for small deviations Δv from the center optical frequency, the pattern is constant, and shifts in $\Delta_D$ with this predicted angular dispersion. It should be noted:

$$\frac{d\theta}{d\lambda} = \frac{d\theta}{dv}\frac{dv}{d\lambda} = \frac{-v}{\lambda}\frac{d\theta}{dv} = \frac{+(\sin\theta_i + \sin\theta_D)}{\lambda\cos\theta_D} \quad (13)$$

The grating equation for an ordinary grating is:

$$\sin\theta_i + \sin\theta_D = m\frac{\lambda}{\Lambda}, \quad (14)$$

where m is the grating order. Therefore:

$$\frac{d\theta}{d\lambda} = \frac{m}{\Lambda\cos\theta_D}, \quad (15)$$

which is the same as an ordinary grating, even for m>>1.

Now, with the desired result established (i.e., $\theta_D$—pattern is constant, for narrow band signals, except for simple shift with v), the following definitions may be established:

$$K(\theta) \equiv G(\theta, v_c), \quad (16)$$

where $v_c$ is the center frequency for a given WDM channel, i.e., K(θ) is what is recorded if the far-field pattern is detected for a laser tuned to $v_c$ (unmodulated) at a diffraction angle θ. Thus, $$G(\theta, v_c + f) = K\left(\theta + \frac{d\theta}{dv} \cdot f\right), \quad (17)$$

where f is the low-pass frequency variable and $v=v_c+f$. Then the measured far-field pattern for a modulated signal, with low pass power spectrum $S_{LP}(f) \equiv S(v_c+f)$ is thus $$\int_{-\infty}^{\infty} |\xi(\theta, f)|^2 df \equiv I(\theta) = \int_{-\infty}^{\infty} S_{LP}(f) K\left(\theta + \frac{d\theta}{dv} \cdot f\right) df \quad (19)$$

Finally, the formal (Green's) function or SIR is defined as:

$$H(\xi) \equiv K\left(-\xi \cdot \frac{d\theta}{dv}\right) \quad (20)$$

By scaling the independent variable by the factor $$-\frac{d\theta}{dv},$$

the average measured intensity I(θD) is:

$$I(\theta_D) = \int_{-\infty}^{\infty} S_{LP}(f) H\left(\frac{-\theta_D}{\frac{d\theta}{dv}} - f\right) df \quad (21)$$

Thus, the result is reached, that for narrow band signals, the diffraction pattern resulting from an imperfect, very long-period grating (echelle array) is a convolution of the power spectrum of the signal with an SIR, the $f \rightarrow \theta_D$ conversion being performed by a scaling by $$\frac{d\theta}{d\nu}.$$

Thus, by programming processor 126 to deconvolve the SIR obtained from known signals during calibration, from the measured far-field pattern, the power spectrum can be accurately estimated. Processor 126 may be readily programmed to perform these calculations using MathCAD™ or similar software products.

To experimentally verify the mathematical model provided above, five different light signals were applied to the spectrometer. The first light signal had a wavelength of 1545.00 nm, the second light signal had a wavelength of 1545.02 nm, the third light signal had a wavelength of 1545.04 nm, the fourth light signal had a wavelength of 1545.08 nm, and the fifth light signal had a wavelength of 1545.16 nm. The waveforms of the patterns obtained from photodetector array 122 are plotted in FIGS. 5A–5E. As apparent from FIGS. 5A–5E, the pattern stays roughly the same, aside from a physical shift, which is proportional to the frequency shift. Relative to the photodetector array, the exhibited shift is about 0.8 pixels per GHz. The photodetector array was about 1 m away from the echelle array, resulting in an angular dispersion of approximately 80 microradians per GHz. An ordinary grating has an angular dispersion of over 20 times this amount.

The particular echelle array that was utilized to obtain the waveforms shown in FIGS. 5A–5E was made of a plurality of stacked microscope slides that were offset from one another by 750 microns. Despite the rudimentary design, the power spectrums for these signals were accurately estimated. The cross-correlations between the detuned curves and the 1545.00 nm curve are shown in FIGS. 6A–6D. As is apparent, there is a strong correlation peak up to 20 GHz detuning. Of significance, the correlation peak remains at the same approximate energy (about 10 units), and the sub-correlations are approximately random and vary about zero.

If resolution and aliasing are lesser concerns, as in the case of a channel monitor, an alternative processing method may be employed to obtain the correct spectral estimate for a light signal using the same echelle array. The basis of this alternative method is described as follows. The recorded pattern is, in general, a superposition of the patterns for all the wavelength components, weighted by its relative power spectral density. Thus, by fitting the data to a weighted sum of each of the individual waveforms using a linear, least mean-square (LMS) error regression, the vector of components effectively serves as a spectral estimate. The LMS error regression effectively finds the combination of wavelength functions that gives the least error in the power estimate.

Although the spectrometer of the present invention has been described above as being used as either a PMD sensor or a WDM channel monitor, it will be apparent to those skilled in the art that the inventive spectrometer may be used for any other purpose in which optical spectrometers are employed.

It will become apparent to those skilled in the art that various modifications to the preferred embodiment of the invention as described herein can be made without departing from the spirit or scope of the invention as defined by the appended claims.

The invention claimed is:

1. A spectrometer for determining the power spectrum of a light signal that falls within a predetermined wavelength band centered about a central wavelength, said spectrometer comprising:

an echelle array disposed in the path of the light signal so as to diffract the incident light signal, said echelle array having a plurality of diffraction scattering sites periodically spaced apart by a distance of at least about five times the central wavelength;

a photodetector array positioned to receive a far-field diffraction pattern produced by the diffracted light from said echelle array and to output electrical signals representing the spatial pattern and relative intensity of the far-field diffraction pattern; and a processing circuit coupled to said photodetector array for processing the electrical signals to determine the power spectrum of the light signal.

2. The spectrometer of claim 1, wherein said processor circuit includes a processor and a memory coupled to said processor, said processor calibrates by measuring far-field diffraction patterns and determining spatial impulse responses (SIRs) for light at a plurality of different known wavelengths, and stores the SIRs in a table in said memory.

3. The spectrometer of claim 2, wherein, when the light signal is projected onto said echelle array, a far-field diffraction pattern for the light signal is obtained on said photodetector array, and said processor processes the output of said photodetector array to determine the power spectrum for the light signal, said processor determines the power spectrum by deconvolving the SIRs obtained during calibration from the far-field diffraction pattern measured for the light signal.

4. The spectrometer of claim 1, wherein the spacing between scattering sites of said echelle array is at least about 50 times the central wavelength.

5. The spectrometer of claim 1, wherein the spacing between scattering sites of said echelle array is at least about 100 times the central wavelength.

6. The spectrometer of claim 1, wherein the spacing between scattering sites of said echelle array is about 750 microns.

7. The spectrometer of claim 1, wherein the central wavelength is about 1.5 microns.

8. The spectrometer of claim 7, wherein the spacing between scattering sites of said echelle array is at least about 50 times the central wavelength.

9. The spectrometer of claim 7, wherein the spacing between scattering sites of said echelle array is at least about 100 times the central wavelength.

10. The spectrometer of claim 7, wherein the spacing between scattering sites of said echelle array is about 750 microns.

11. The spectrometer of claim 1 and further including a collimating lens for collimating the light signal and projecting the collimated light signal onto said echelle array.

12. The spectrometer of claim 1 and further including a Fourier Transform lens for relaying the far-field diffracted by said echelle array to said photodetector array.

13. A method of determining the power spectrum of a light signal, the method comprising the steps of:

providing a spectrometer having a processor, a memory coupled to the processor, and a photodetector array coupled to the processor;

providing an echelle array within the path of the light emitted from the light source to diffract the light and form a far-field diffraction pattern on the photodetector array;

calibrating the spectrometer by projecting light having given wavelengths onto the echelle array, measuring the corresponding far-field diffraction patterns on the photodetector array, and determining spatial impulse responses (SIRs) for each wavelength using the processor;

storing the SIRs obtained during calibration in a table in the memory of the spectrometer;

projecting the light signal onto the echelle array to obtain a far-field diffraction pattern for the light signal on the photodetector array; and processing the output of the photodetector array using the processor to determine the power spectrum for the light signal, the processor determines the power spectrum by deconvolving the SIRs obtained during calibration from the far-field diffraction pattern measured for the light signal.

14. The method of claim 13, wherein the light signal has a wavelength that falls within a predetermined wavelength band centered about a central wavelength, and the echelle array has a plurality of diffraction scattering sites periodically spaced apart by a distance of at least about five times the central wavelength.

15. The method of claim 14, wherein the central wavelength is about 1.5 microns.

16. The method of claim 13, wherein the SIR is defined as:

$$H(\xi) \equiv K\left(-\xi \cdot \frac{d\theta}{d\nu}\right),$$

where $\xi$ is the scattered field at the surface of said echelle array, K is the recorded far-field pattern, $\nu$ is the temporal frequency variable, and $\theta$ is the diffraction angle.

17. A spectrometer for determining the power spectrum of a light signal, the spectrometer comprising:

a processor circuit including a memory;

a photodetector array coupled to said processor; and an echelle array within the path of the light signal to diffract the light signal and form a far-field diffraction pattern on said photodetector array, wherein said processor calibrates by measuring far-field diffraction patterns and determining spatial impulse responses (SIRs) for light at a plurality of different known wavelengths, and stores the SIRs in a table in said memory, and wherein, when the light signal is projected onto said echelle array, a far-field diffraction pattern for the light signal is obtained on said photodetector array, and said processor processes the output of said photodetector array to determine the power spectrum for the light signal, said processor determines the power spectrum by deconvolving the SIRs obtained during calibration from the diffraction pattern measured for the light signal.

18. The spectrometer of claim 17, wherein the light signal has a wavelength that falls within a predetermined wavelength band centered about a central wavelength, and said echelle array has a plurality of diffraction scattering sites periodically spaced apart by a distance of at least about five times the central wavelength.

19. The spectrometer of claim 18, wherein the central wavelength is about 1.5 microns.

20. The spectrometer of claim 17, wherein the SIR is defined as:

$$H(\xi) \equiv K\left(-\xi \cdot \frac{d\theta}{d\nu}\right),$$

where $\xi$ is the scattered field at the surface of said echelle array, K is the recorded far-field pattern, $\nu$ is the temporal frequency variable, and $\theta$ is the diffraction angle.

* * * * *